Nov. 3, 1936.  R. E. KAESTNER  2,059,997
DUMPING AND DRAINING APPARATUS
Filed May 9, 1936  2 Sheets-Sheet 1
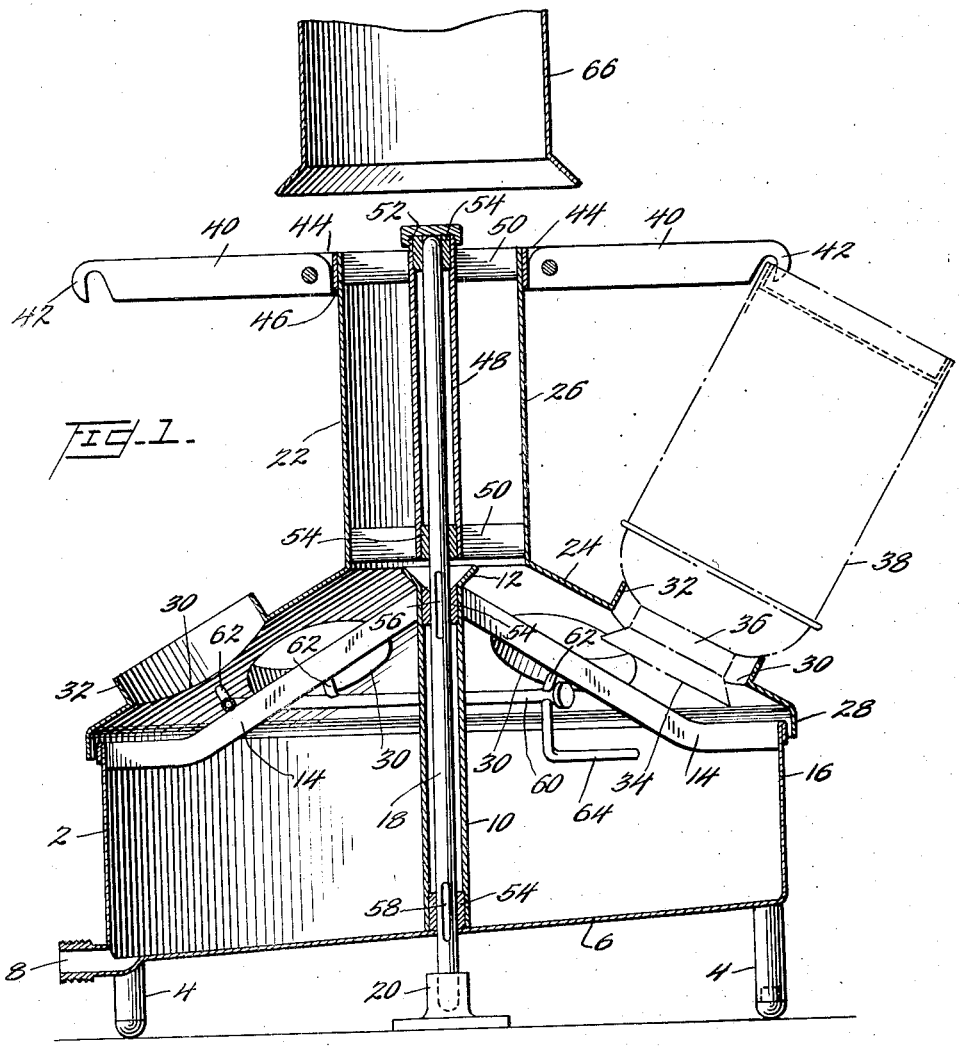
Inventor
*Robert E. Kaestner,*
By *Chas. Silver*
Attorney Nov. 3, 1936.   R. E. KAESTNER   2,059,997
DUMPING AND DRAINING APPARATUS
Filed May 9, 1936   2 Sheets-Sheet 2
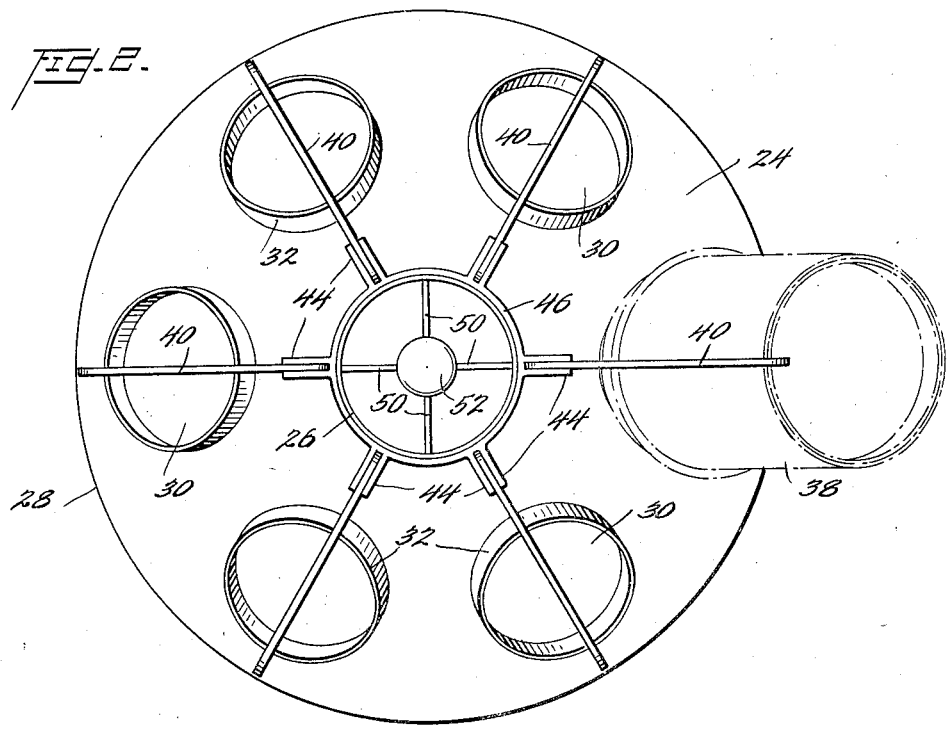
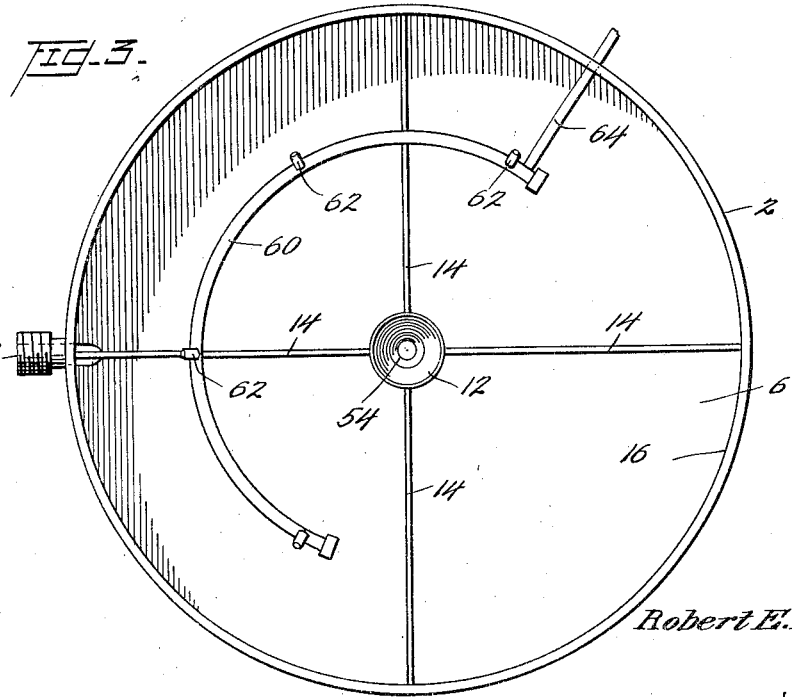
Inventor
Robert E. Kaestner,
By Chas. Silver
Attorney Patented Nov. 3, 1936

2,059,997

UNITED STATES PATENT OFFICE 2,059,997

DUMPING AND DRAINING APPARATUS

Robert E. Kaestner, Baltimore, Md., assignor to E. A. Kaestner Company, a corporation of Maryland Application May 9, 1936, Serial No. 78,943

18 Claims. (Cl. 221—69)

This invention relates to improvements in dumping and draining tanks for draining and recovering liquids such as milk and cream from cans.

Among the objects of this invention is to provide an apparatus of this character whereby the milk or cream is thoroughly drained and recovered from cans in a simple inexpensive and efficient manner, the apparatus being provided with means for preventing the introduction into the liquid of dirt and other extraneous matter that may be upon the cans and drop off therefrom during the handling of the cans.

A further object of this invention is to provide an apparatus of this kind whereby the cans are conveniently and securely seated in a definite position for dumping to assure complete draining while, at the same time, disposed for convenient removal after draining.

A still further object of this invention is to provide an apparatus of this character with means for introducing a spray of steam or other non-objectionable washing fluid into the cans being emptied of their cream or milk content.

A still further object of this invention is to provide an apparatus of this character with a rotatable carrier whereby the cans undergoing dumping and draining may be moved into the path of the sprays of steam or other cleansing fluid, special means being provided to prevent fouling and contamination of the milk or cream by any lubricating material on the shaft of the rotating carrier.

Other, further and more specific objects of this invention will become readily apparent to persons skilled in the art from a consideration of the following description when taken in conjunction with the accompanying drawings wherein:

Fig. 1 is a vertical section through my dumping and draining device, showing a can in dumping position.

Fig. 2 is a top plan view of the apparatus, with the chimney removed.

Fig. 3 is a top plan view of the tank with the rotatable carrier removed.

The apparatus comprises a tank or vessel 2, preferably of cylindrical form, supported upon the legs 4. This vessel is provided with a sloping bottom 6, at the lowest part of which is the discharge opening or outlet 8. Extending upwardly from the bottom 6 of this vessel is a centrally disposed hollow shaft 10, which is flared at the top to provide a funnel construction 12. A plurality of ribs or stay rods 14 extend radially from the shaft 10 to the side wall 16 of the vessel 2. A shaft 18 is positioned within the shaft 10 and projects downwardly and outwardly therefrom beyond the bottom 6 and rests in the thrust bearing stud 20. This shaft 18 also projects upwardly beyond the hollow shaft 10 and supports a rotatable conveyer or carrier, designated as a whole by the reference numeral 22. This carrier comprises a conical portion 24 connected at its upper end to the cylindrical sleeve or stack 26 and at the lower portion is continuous with a cylindrical extension 28 which overlies the vessel 2 when the carrier is in operative position and extends below the upper edge of the vessel 2. This conical portion 24 has a plurality of openings 30, preferably uniformly spaced from each other and from the axis of the carrier, and at each of these openings there is provided a neck portion 32 extending outwardly from the conical portion.

The openins 30 are of adequate size to receive the mouth 34 and neck 36 of the can 38 but are smaller than the circumferential cross-section of the main body of the cans, and thus provide seats when the cans assume the position shown in Fig. 1. In order to hold these cans in position, there are provided the securing members or arms 40 with hook ends 42 which engage the bottom of the can, as shown in Fig. 1, and prevent the can from tilting downward. These arms or bars 40 are pivoted to the lugs 44 projecting from the band 46 secured to the sleeve 26.

Positioned within the sleeve 26 and concentric with and surrounding shaft 18 is the hollow shaft 48. In order to maintain this shaft in position and provide a rigid construction, the two sets of ribs 50 extend from shaft 48 to the sleeve 26, at the top and bottom thereof. The upper portion of the shaft 48 is threaded to receive the thrust or bearing cap 52 which rests upon the top of the shaft 18. The weight of the rotating carrier bears upon the top of this shaft 18 at the thrust cap 52.

This thrust cap 52 may be made entirely of bearing metal or, if desired, a lining of bearing metal may be provided on the inner facing. Bearings 54 of suitable material are also provided between the shaft 18 and the hollow shafts 10 and 48. Any lubricant material that flows down between the shafts 18 and 48 will enter the funnel shaped portion of the shaft 10 and passing downward through the slot 56 in the shaft 18 will continue downward and then pass out by way of the slot 58 and flow down to the stud bearing 20. It will thus be seen that, by this arrangement, the lubricant material is kept away from the liquid in the vessel 2.

This apparatus is also provided with a steam pipe 60 containing a plurality of nozzles 62. These nozzles are disposed to direct a spray of steam or other cleansing fluid into the cans, seated as shown in Fig. 1, as the can is brought to a position where the opening 30 in the table 24 registers with the nozzle. In the specific illustration, there are shown six openings and four nozzles. This is a very convenient and satisfactory arrangement, because the table can be brought into a position where the seat for the can on which the full can is placed and the seat for the can from which the empty can is removed will not be in line with the steam jets, while the other four seats are in line and are receiving a spray of steam. Employing such an arrangement, a can is placed in an opening which is not in registry with any nozzle and, as the table is turned, the can will come successively in the paths of the four sprays of steam. By regulating the rate of turning, the can will be emptied of its contents when it has passed the last steam jet and has reached the position for its removal.

The steam pipe 60 is closed at each end and steam is supplied through the pipe 64 which passes through the wall 16 of the vessel 2, preferably at a point immediately below the edge of the overlapping portion 28 of the rotating carrier 22. The steam pipe 60 and nozzles 62 are preferably located at a higher position than the top of the tank or vessel 2.

In order to carry off the fumes and vapors, there is provided a chimney 66 in spaced relation to and above the rotating carrier 22.

The vessel or tank 2 is emptied of its contents through the outlet 8.

My invention, while specially adapted to the dumping and draining of cans holding cream and milk, may also be employed to great advantage in dumping and draining similar cans containing other liquids, for example, syrups, oils, adhesives and various viscous and non-viscous liquids. By placing the cans on the seats in outwardly extended position wherein the axes of the cans diverge outwardly and upwardly from the axis of rotation of the carrier, as shown in Fig. 1, the cans are easily relieved of their contents with a minimum of handling. The hooks 42 are brought into the locking position with a minimum of manual operation. A can in this position is also readily removable from its seat after the contents of the can have passed into the vessel 2. By providing the necks 32 on the conical table, dirt and other extraneous material are kept out of the vessel 2.

The apparatus may be constructed of any suitable material that will withstand the use of the particular liquids to be introduced therein. For milk and cream, stainless steel has been found very satisfactory for those parts coming in contact with these liquids. The bearings engaging the shafts are preferably made of bronze, commonly employed for this purpose.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as are indicated in the appended claims.

I claim as my invention:

1. In combination, a vessel, a rotatable carrier comprising a cover for said vessel, said cover being adjacent to and over said vessel and having a plurality of openings of adequate size to receive the mouth and neck of milk and cream cans and smaller than the cross-section of the bodies of said cans and thereby provide seats for the cans, a plurality of sprays within said vessel and disposed to direct jets of fluid into cans seated in the openings of said cover, a plurality of securing members extending from said carrier for retaining said cans in position on the seats, a shaft passing through said vessel, means for supporting said shaft and a thrust bearing at the top of said shaft whereby said rotatable carrier is supported.

2. In combination, a vessel, a carrier comprising a cover for said vessel, said cover being adjacent to and over said vessel and forming a conical turn-table having a plurality of openings of adequate size to receive the mouth and neck of milk and cream cans and smaller than the cross-section of the bodies of said cans and thereby provide seats for the cans, a plurality of sprays within said vessel, and disposed to direct jets of fluid into cans seated in the openings of said table, a plurality of securing members extending from said carrier for retaining said cans on the seats in outwardly extended position wherein the axes of the cans diverge outwardly and upwardly from the axis of rotation of the carrier, a shaft passing through said vessel, means for supporting said shaft and a thrust bearing at the top of said shaft and connected to said rotatable carrier whereby said carrier is supported.

3. In combination, a vessel, a rotatable carrier comprising a cover for said vessel, said cover being adjacent to and over said vessel and having a plurality of openings, with an outwardly-projecting neck at each opening of adequate size to receive the mouth and neck of milk and cream cans and smaller than the cross-section of the bodies of said cans and thereby provide seats for the cans, a plurality of sprays within said vessel and disposed to direct jets of fluid into cans seated in the openings of said cover, a plurality of securing members extending from said carrier for retaining said cans in position on the seats, a shaft passing through said vessel, means for supporting said shaft and a thrust bearing at the top of said shaft whereby said rotatable carrier is supported.

4. In combination, a vessel, a carrier comprising a cover for said vessel, said cover being adjacent to and over said vessel, and forming a conical turn-table having a plurality of openings, with an outwardly-projecting neck at each opening of adequate size to receive the mouth and neck of milk and cream cans and smaller than the cross-section of the bodies of said cans and thereby provide seats for the cans, a plurality of sprays within said vessel and disposed to direct jets of fluid into cans seated in the openings of said table, a plurality of securing members extending from said carrier for retaining said cans on the seats in outwardly extended position wherein the axes of the cans diverge outwardly and upwardly from the axis of rotation of the carrier, a shaft passing through said vessel, means for supporting said shaft and a thrust bearing at the top of said shaft and connected to said rotatable carrier whereby said carrier is supported.

5. In combination, a vessel, a rotatable carrier comprising a cover for said vessel, said cover being adjacent to and overhanging said vessel and extending below the top of said vessel and having a plurality of openings, with an outwardly-projecting neck at each opening of adequate size to receive the mouth and neck of milk and cream cans and smaller than the cross-section of the bodies of said cans and thereby provide seats for the cans, a plurality of sprays within said vessel and disposed to direct jets of fluid into cans seated in the openings of said cover, a plurality of securing members extending from said carrier for retaining said cans in position on the seats, a shaft passing through said vessel, means for supporting said shaft and a thrust bearing at the top of said shaft whereby said rotatable carrier is supported.

6. In combination, a vessel having a sloping bottom, a rotatable carrier having a table adjacent to and overhanging said vessel and extending below the top of said vessel, said table having a plurality of openings, with an outwardly-projecting neck at each opening of adequate size to receive the mouth and neck of milk and cream cans and smaller than the circumferential cross-section of the main body of said cans and thereby provide seats for the cans, a plurality of sprays within said vessel and disposed to direct jets of fluid into cans seated in the openings of said table, a sleeve extending upwardly from said table, a plurality of securing members pivoted to and extending from said sleeve for retaining said cans in position on the seats, a shaft passing through said vessel and said sleeve, means for supporting said shaft and a thrust bearing at the top of said shaft whereby said rotatable carrier is supported.

7. In combination, a vessel having a sloping bottom, a carrier having a conical turn-table adjacent to and overhanging said vessel and extending below the top of said vessel, said turn-table having a plurality of openings, with an outwardly-projecting neck at each opening of adequate size to receive the mouth and neck of milk and cream cans and smaller than the circumferential cross-section of the main body of said cans and thereby provide seats for the cans, a plurality of sprays within said vessel and disposed to direct jets of fluid into cans seated in the openings of said table, a sleeve extending upwardly from said table, a plurality of securing members pivoted to and extending from said sleeve for retaining said cans on the seats in outwardly extended position wherein the axes of the cans diverge outwardly and upwardly from the axis of rotation of the carrier, a shaft passing through said vessel, means for supporting said shaft and a thrust bearing at the top of said shaft and connected to said rotatable carrier whereby said carrier is supported.

8. The combination claimed in claim 3, wherein the securing members for retaining the cans in position on the seats are arms provided with a hook at the free end.

9. The combination claimed in claim 7, wherein the securing members for retaining the cans in position on the seats are arms provided with a hook at the free end.

10. In a can draining and dumping apparatus, a vessel, a rotatable carrier comprising a cover for said vessel, said cover being adjacent to and over said vessel and having a plurality of openings forming seats for cans, a plurality of sprays within said vessel and disposed to direct jets of fluid into cans seated in the openings of said cover, a plurality of securing members extending from said carrier for retaining said cans in position on the seats, a shaft passing through said vessel, means for supporting said shaft and a thrust bearing at the top of said shaft whereby said rotatable carrier is supported.

11. In a can draining and dumping apparatus, a vessel, a carrier comprising a cover for said vessel, said cover being adjacent to and over said vessel and forming a conical turn-table having a plurality of openings, with an outwardly-projecting neck at each opening forming seats for cans, a plurality of sprays within said vessel and disposed to direct jets of fluid into cans seated in the openings of said table, a plurality of securing members extending from said carrier for retaining said cans on the seats in outwardly extended position wherein the axes of the cans diverge outwardly and upwardly from the axis of rotation of the carrier, a vertical shaft passing through said vessel, means for supporting said shaft and a thrust bearing at the top of said shaft and connected to said rotatable carrier whereby said carrier is supported.

12. In a can draining and dumping apparatus, a vessel, a rotatable carrier having a table adjacent to and overhanging said vessel and extending below the top of said vessel, said table having a plurality of openings, with an outwardly-projecting neck at each opening forming seats for cans, a plurality of sprays within said vessel and disposed to direct jets of fluid into cans seated in the openings of said table, a sleeve extending upwardly from said table, a plurality of securing members pivoted to and extending from said sleeve for retaining said cans in position on the seats, a hollow shaft in said vessel, another hollow shaft in said sleeve above the first-named hollow shaft and in alinement therewith, a central shaft disposed in said hollow shafts, means for supporting said central shaft, a thrust bearing at the top of said central shaft whereby said rotatable carrier is supported and means on said lower hollow shaft for preventing lubricating material from the upper hollow shaft from entering said vessel.

13. In a can draining and dumping apparatus, a vessel having a sloping bottom, a rotatable carrier having a table adjacent to and overhanging said vessel and extending below the top of said vessel, said table having a plurality of openings, with an outwardly-projecting neck at each opening forming seats for cans, a plurality of sprays within said vessel and disposed to direct jets of fluid into cans seated in the openings of said table, a sleeve extending upwardly from said table, a plurality of securing members pivoted to and extending from said sleeve for retaining said cans in position on the seats, a hollow shaft in said vessel, another hollow shaft in said sleeve above the first-named hollow shaft and in alinement therewith, a central shaft disposed in said hollow shafts, means for supporting said central shaft, a thrust cap connected to the top of the hollow shaft in said sleeve and bearing upon the top of said central shaft whereby said rotatable carrier is supported and means on said lower hollow shaft for preventing lubricating material from the upper hollow shaft from entering said vessel.

14. In a can draining and dumping apparatus, a vessel having a sloping bottom, a carrier having a conical turn-table adjacent to and overhanging said vessel and extending below the top of said vessel, said turn-table having a plurality of openings, with an outwardly-projecting neck at each opening forming seats for cans, a plurality of sprays within said vessel and disposed to direct jets of fluid into cans seated in the openings of said table, a sleeve extending upwardly from said table, a plurality of securing members pivoted to and extending from said sleeve for retaining said cans on the seats in outwardly extended position wherein the axes of the cans diverge outwardly and upwardly from the axis of rotation of the carrier, a hollow shaft in said vessel, another hollow shaft in said sleeve above the first-named hollow shaft and in alinement therewith, a central shaft disposed in said hollow shafts, means for supporting said central shaft, a thrust cap connected to the top of the hollow shaft in said sleeve and bearing upon the top of said central shaft whereby said carrier is supported and means on said lower hollow shaft for preventing lubricating material from the upper hollow shaft from entering said vessel.

15. The combination claimed in claim 14, wherein the securing members for retaining the cans in position on the seats are arms provided with a hook at the free end.

16. In combination, a vessel, a rotatable carrier having a table adjacent to and over said vessel, said table having a plurality of openings, with an outwardly-projecting neck at each opening of adequate size to receive the mouth and neck of milk and cream cans and smaller than the cross-section of the bodies of said cans and thereby provide seats for the cans, a plurality of sprays within said vessel and disposed to direct jets of fluid into cans seated in the openings of said table, a plurality of arms extending from said carrier and provided with a hook at the free end for retaining said cans in position on the seats, a shaft passing through said vessel, means for supporting said shaft and a thrust bearing at the top of said shaft whereby said rotatable carrier is supported.

17. In a can draining and dumping apparatus, a vessel, a rotatable carrier comprising a cover for said vessel, said cover being adjacent to and over said vessel and having a plurality of openings forming seats for cans, a plurality of sprays within said vessel and disposed to direct jets of fluid into cans seated in the openings of said cover, a plurality of securing members extending from said carrier for retaining said cans in position on the seats, a hollow shaft in said vessel, another hollow shaft above the first-named hollow shaft and in alinement therewith, a central shaft disposed in said hollow shafts, means for supporting said central shaft, a thrust cap connected to the top of the hollow shaft and bearing upon the top of said central shaft whereby said rotatable carrier is supported and means on said lower hollow shaft for preventing lubricating material from the upper hollow shaft from entering said vessel.

18. In a can draining and dumping apparatus, a vessel, a carrier comprising a cover for said vessel, said cover being adjacent to and over said vessel and forming a conical turn-table having a plurality of openings forming seats for cans, a plurality of sprays within said vessel and disposed to direct jets of fluid into cans seated in the openings of said table, a plurality of securing members extending from said carrier for retaining said cans on the seats, a hollow shaft in said vessel, another hollow shaft above the first-named hollow shaft and in alinement therewith, a central shaft disposed in said hollow shafts, means for supporting said central shaft, a thrust cap connected to the top of the hollow shaft and bearing upon the top of said central shaft whereby said carrier is supported and means on said lower hollow shaft for preventing lubricating material from the upper hollow shaft from entering said vessel.

ROBERT E. KAESTNER.